Jan. 19, 1965 E. PALPACELLI 3,165,773
ELECTRICALLY ACTUATED, AUTOMATIC SUCTION DOOR-MAT
Filed Oct. 26, 1961 2 Sheets-Sheet 1

Inventor:
Elio Palpacelli

United States Patent Office 3,165,773
Patented Jan. 19, 1965

3,165,773
ELECTRICALLY ACTUATED, AUTOMATIC
SUCTION DOOR-MAT
Elio Palpacelli, Via Gallia 2, Rome, Italy
Filed Oct. 26, 1961, Ser. No. 147,797
Claims priority, application Italy Oct. 28, 1960
3 Claims. (Cl. 15—310)

This invention relates to the mats utilized on door thresholds and house entrances for wiping the visitors' shoes thereon.

A first object of the invention is to provide a mat of the kind referred to above, adapted for removing dust, mud and the like adhering to the shoe soles when it is trod upon.

Another purpose of the invention is to provide a mat of the kind referred to above, comprising suction means the action of which is limited to the surface of said mat on which pressure is exerted.

A further object of the invention is to provide a mat as specified above, wherein said suction means are electrically operated and energized when any portion of the mat surface is pressed, and wherein the suction action of said means will last only during the period of time when said surface portion remains pressed.

These and other objects of the invention will become apparent from the following detailed description with reference to the accompanying drawing, wherein.

Figures 1, 2, 3:
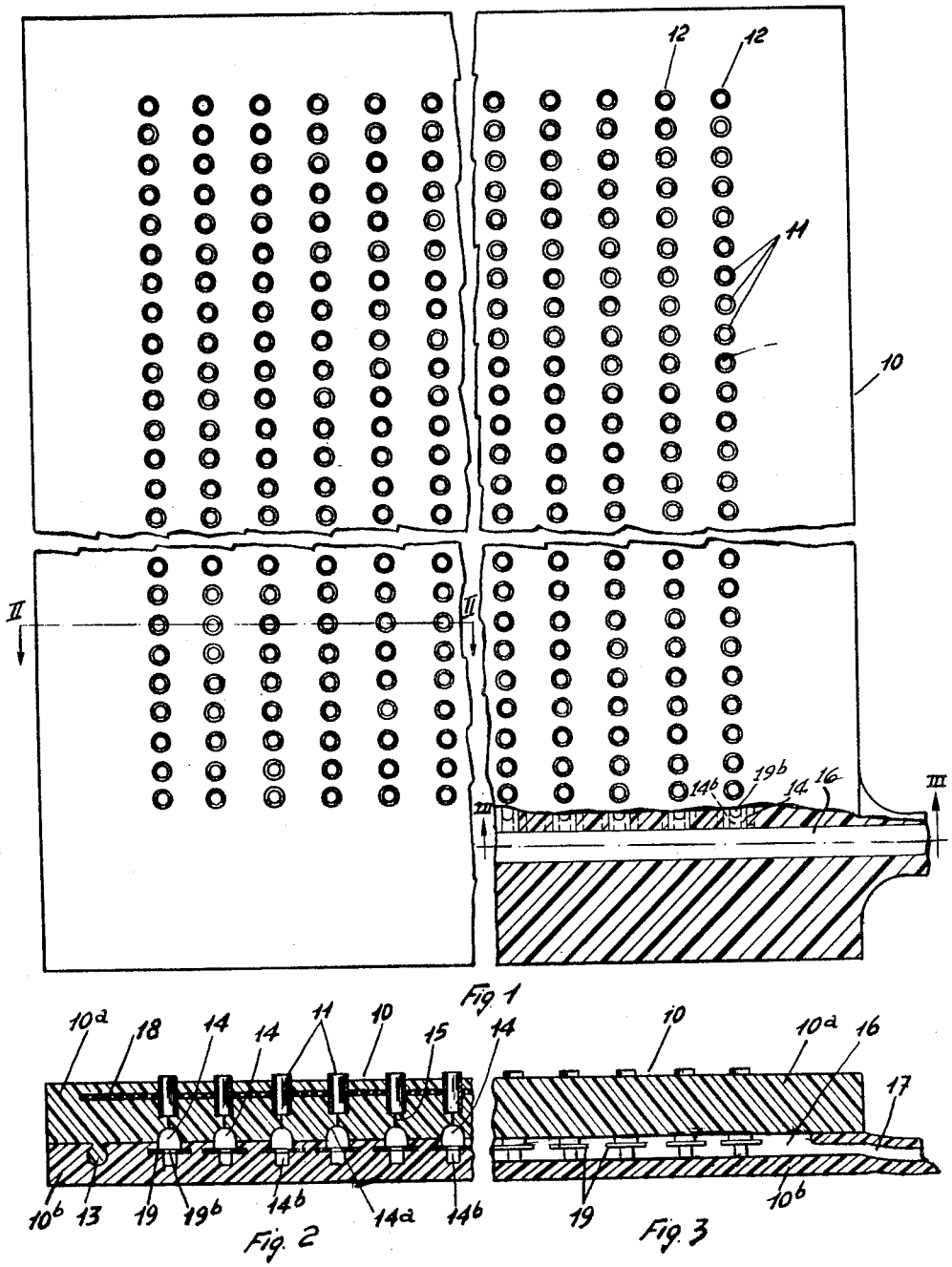
FIG. 1 is a broken away plan view of the mat showing a plurality of rows of tubes imbedded in the upper layer of the support.
FIG. 2 is a section through one row of tubes and the related channels, the section being taken along line II—II of FIG. 1.
FIG. 3 is a section along line III—III of FIG. 1.

A mat according to the invention essentially comprises a support 10 of elastically yieldable material, preferably rubber, or a suitable compressible plastic material, including a plurality of metal tubes 11 arranged in rows 12 in one side and embedded in said support so as to protrude by a suitable length from one face thereof. The tubes may be made of metal, or other electrically conductive material. In an advantageous embodiment of the invention, the support 10 comprises a first and a second layer of said material disconnectable from one another, 10a and 10b respectively, means being provided for restrained connection between said two layers, including an edge 13 on the first one of said layers, seating into a groove for restraining movement of the first layer relative to the second of said layers. As shown in FIG. 2, the first layer 10 has a projection or tongue 13 integral with and projecting beyond the face thereof adjoining the second layer. The projection or tongue which is of circular segmental, or other arcuate contour extends substantially along the entire length of the first layer, the width of the tongue at the junction with the face of the second layer being narrower than the diameter thereof. The mating surface of the second layer 10b has a corresponding groove in the upper face thereof, the groove being of a circular segmental cross-section, corresponding to the cross-sectional contour of the tongue. When the first layer is pressed toward the second layer, the tongue 15 fits into the groove in the second layer, thus retaining the second layer in engagement with the first layer. According to the invention, the support 10 is provided with a plurality of channels 14 formed therein, each of which is disposed in register with, and parallel to, each of the side-by-side rows of the tubes 12 beneath the end of said tubes embedded in the support 10, so that between said one end of each tube and the surface delimiting said channel will be interposed a portion of said elastic material of the support for separating the tube from the channel.

In the embodiment illustrated in the drawings, the channels 14 are obtained by providing in said first layer a plurality of grooves 14a disposed in register with each of said rows of tubes, and a plurality of grooves 14b in said second layer, disposed in register with the grooves in the first layer, so as to form therewith a plurality of channels with closed contour when said two layers are superimposed and connected to one another. In the portion of material comprised between the embedded end of the tubes and the surface delimiting said channels at the top, there is formed a plurality of slits 15, each in register with said rows of tubes, so as to place the tubes in communication with the channel, the edges of said slits being normally brought in contact with one another so as to close said communication and being elastically opened in order to allow the end of each tube to come into communication with said channel when a pressure is exerted on the tube from the outside. According to the invention, said plurality of channels merges in a single header duct 16, extending in a flexible tube or hose 17 adapted for connecting said header to electrically-operated pneumatic suction means.

As shown in the drawings, the suction means is controlled by voltage fed from a transformer 25 of the conventional type, which steps the line voltage down to a voltage of the order of 8–10–12 volts. This low voltage would reduce any possibility of injury to the user of the door-mat to a minimum, regardless of the condition of the shoes of the user. Further, in accordance with the invention, circuit means are provided to establish electric connection with said suction means and to energize the latter only when a pressure is exerted upon at least one of said tubes, so as to place the tube in communication with the corresponding channel. In a preferred embodiment, said circuit means include an electric connection comprising a wire net 18 between said plurality of tubes, each of which constitutes the movable contact of a control switch for said suction means, said wire net being suitably embedded in the material of layer 10a of support 10. The fixed contact of said switch is realized by providing a plurality of metal laminations 19, each of which projects into each of the grooves 14b of the layer 10b of said support 10. These laminations 19 extend throughout the length of the corresponding grooves and are formed with a longitudinal slot 19b which subdivides each of said grooves in two groove portions having different transversal dimensions.

Figure 4:
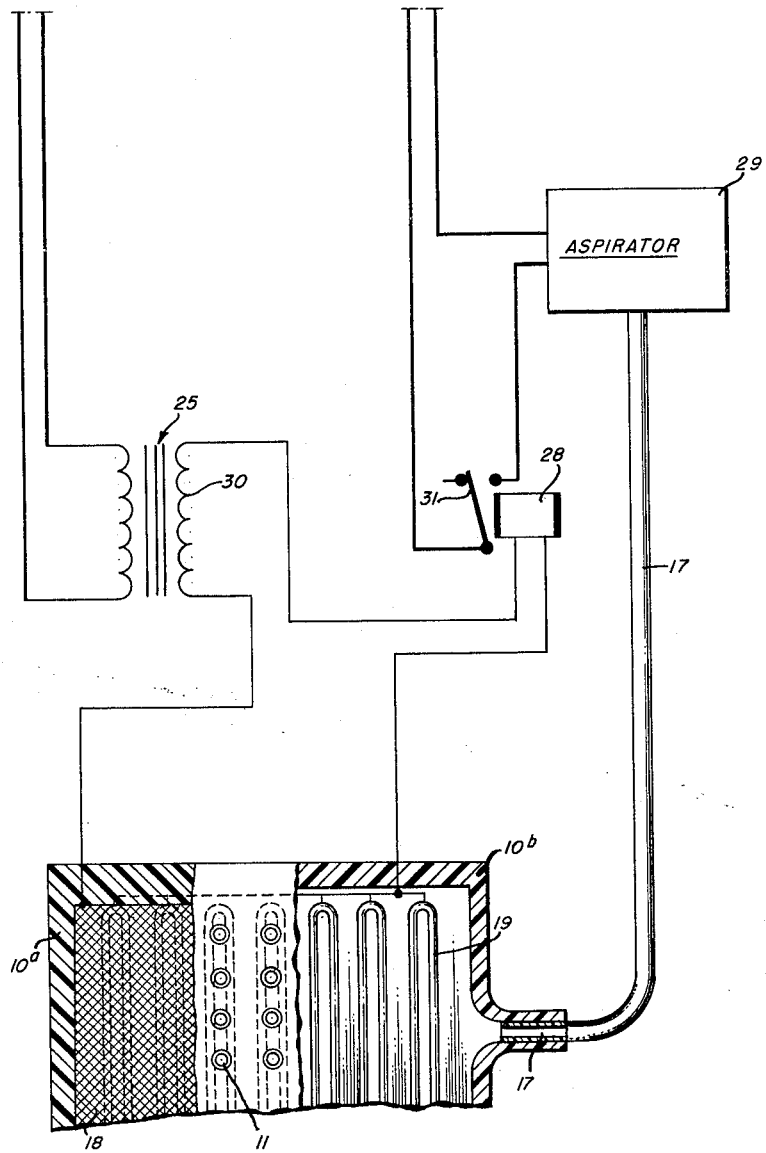
FIG. 4 is a plan view of one of the laminations used in conjunction with the tubes shown in FIG. 1, for the transmission of voltage. This also includes the aspirator control circuits.

As shown in the FIGS. 4, the suction means, or aspirator 28, which is connected to the second layer 10b of the support by a flexible tube 17, or other suitable connection means, is controlled by voltage fed from a transformer 25, which steps the line voltage down to a voltage of the order of 8–12 volts.

The voltage from the transformer 25 is fed to a wire net 18, which surrounds and is directly connected to the rows of tubes 11, thus establishing electrical contact with the tubes 11.

The laminations 19 which are imbedded in the second layer and individually axially aligned with the tubes 11, are connected to a solenoid 28, or other type of switching mechanism 31, which is directly connected to the secondary coil 30, of the transformer 25, the secondary coil 30 of the transformer is directly connected to the wire net 18, which is directly connected to the tubes 11. The switching mechanism 31, which is actuated by the solenoid 28, is connected to an aspirator 29 or other vacuum generator means, thus providing a vacuum through the channels 14 and 14b, and the tubes 11 aligned therewith, when the switch is closed.

The switching mechanism 31, is actually closed when pressure is applied to groups of individual tubes 11 fitted to the first layer, the tubes being forced downward by pressure applied to the upper end thereof, until the lower end of the tubes engages the laminated connections 19, the slits 15, located below the tubes and the channels 14 aligned with the slits, enabling the individual tubes to be moved toward the laminations 19, without disturbing the other tubes. This energizes the aspirator 29 and generates a vacuum through the tubes 11 in the manner hereinbefore described.

The arrangement of the parts is therefore such that, when a pressure is exerted upon any of the tubes 11 from the outside, said tube will be displaced axially and through the slit 15 and channel 14, it will bear against the metal lamination 19. In these conditions the electrical connection circuit of the suction means will be closed, thereby energizing the latter, the wire net 18 and the lamination 19 being connected in said connection circuit as switch contacts, as stated above. In the position wherein the tubes 11 are in contact engagement with lamination 19, the slots 19b of the latter will establish pneumatic communication between said tubes and the lowermost portion of slots 14b, so as to allow the suction means to intake air through said tubes. It is apparent that, in accordance with the purposes of the invention, the suction action exerted by said suction means will take place when only one or a portion of each of said plurality of tubes is pressed in the manner specified above and this action is confined to the pressed tubes only, the communication between the tubes not pressed and the corresponding channels being interrupted by the respective slit. Further, said action of suction will last only for the period of time during which said tube or portion of tubes remain pressed. In fact, as soon as the pressure action ceases, the elasticity of the material of support 10 will bring the tubes back to their original position by separating them from the laminations 19, thereby disconnecting said electrical connection.

What is claimed is:

1. In a door-mat, a support of elastically yieldable material comprising a first and a second layer of said material disconnectable from one another, restrained connection means between said two layers, including an edge on the first one of said layers, seating into a groove in said second layer to restrain movement of the first layer relative to the second of said layers, a plurality of metal tubes arranged in parallel rows side by side and embedded in said first layer so as to protrude from one face thereof, a plurality of grooves in said first layer, each in register with a corresponding one of said rows of tubes, each of which grooves is formed with an elongated slit for communication between the embedded end of the tubes of one row and a corresponding groove, a plurality of grooves in said second layer, disposed in register with the grooves in said first layer so as to form therewith a plurality of channels with closed contour when said two layers are superimposed and connected to one another, electrically operated suction means and a connection duct between said suction means and said plurality of channels.

2. In a door-mat, a support of elastically yieldable material, said support including a first layer and a second layer adjoining one another, disconnectible means attaching the second layer to the first layer, a plurality of metal tubes arranged in rows side-by-side and embedded in the first layer of said support so as to protrude from one face thereof, a plurality of channels formed in said support, each of which is disposed in register with, and parallel to, each of said side-by-side rows of tubes, an elongated slit in said channels in register with said row of tubes, for placing the latter in communication with said channels when the support is deformed, the edges of each of said slits being normally brought into contact with one another so as to close said communication and being elastically opened in order to allow the end of each tube to come into communication with a corresponding channel when a pressure is exerted on said tube and on the portion of support adjacent thereto, electrically operated suction means connected to said plurality of channels, said electrically operated suction means including an electrical connection between the suction means and the channels, and circuit means to close the electrical connection of said suction means, comprising an electrical conductive member for connecting said plurality of tubes to one another and electrical contacts, each of which is disposed in a respective one of said plurality of channels in register with each of said rows of tubes, the circuit arrangement being such as to close the electrical connection of said suction means only when at least one of said tubes is pressed from the outside and urged into contact engagement with one of said electrical contacts.

3. A door-mat as claimed in claim 2, in which said electrical contacts comprise a wire net embedded in said first layer of the support and in engagement and electrical contact with said plurality of tubes, and said electrical contacts comprise a plurality of electrical contacts inserted in the second layer, each of said contacts being axially aligned with one of the tubes and the corresponding channel, each of said contacts having a slot therethrough, said electric contacts brought by each of the slots of said second layer into contact with the tubes of the corresponding row when the latter are pressed from the outside and axially thrust into the interior of the channel delimited by the slits of said first layer and the slots in the second layer, said wire net and contacts forming respectively the movable contact and the fixed contact of a control switch for said suction means.

References Cited in the file of this patent
UNITED STATES PATENTS 2,562,167   Bilde _____ July 31, 1951
2,895,159   Ostrow _____ July 21, 1959